United States Patent [19]

Vogel

[11] 3,925,426
[45] Dec. 9, 1975

[54] PROCESS FOR THE PRODUCTION OF 1-NITROANTHRAQUINONE

[75] Inventor: Axel Vogel, Cologne, Germany

[73] Assignee: Bayer Aktiengesellschaft, Leverkusen, Germany

[22] Filed: July 2, 1973

[21] Appl. No.: 376,042

[30] Foreign Application Priority Data
July 6, 1972 Germany............................ 2233185

[52] U.S. Cl. ................................................ 260/369
[51] Int. Cl.² ......................................... C07C 79/37
[58] Field of Search ................................... 260/369

[56] References Cited
UNITED STATES PATENTS

| | | |
|---|---|---|
| 2,435,314 | 2/1948 | Kokatnur .......................... 260/369 |
| 2,435,544 | 2/1948 | Kokatnur .......................... 260/369 |
| 3,786,073 | 1/1974 | Frey et al........................... 260/369 |

*Primary Examiner*—James A. Patten
*Assistant Examiner*—E. Jane Skelly
*Attorney, Agent, or Firm*—Burgess, Dinklage & Sprung

[57] ABSTRACT

1-nitroanthraquinone is prepared by nitrating anthraquinone in the presence of an inert organic solvent such as aliphatic or alicyclic hydrocarbons with up to 12 carbon atoms which can be substituted once or several times by halogen or nitro.

15 Claims, No Drawings

PROCESS FOR THE PRODUCTION OF 1-NITROANTHRAQUINONE

BACKGROUND

This invention relates to an improved process for the production of 1-nitroanthraquinone.

It is well known that 1-nitroanthraquinone can be obtained by nitrating anthraquinone with nitric acid (Berichte 16, 54 (1883). When carried out under normal conditions, however, this nitration reaction is accompanied by the formation of, in particular, considerable quantities of dinitroanthraquinones of which 1,5-dinitroanthraquinone is particularly difficult to separate off. Accordingly, the product of the nitration reaction contains at best only about 60 to 65 % of 1-nitroanthraquinone (German Offenlegungsschrift No. 2,039,822).

Various attempts have already been made to improve this process. According to German Offenlegungsschrift No. 2,039,822, nitration is carried out in the heterogeneous phase in aqueous sulphuric acid, the reaction being terminated when approximately 75 % by weight of 1-nitroanthraquinone have been formed which takes about 12 to 15 hours. According to German Offenlegungsschrift No. 2,103,360, nitration is preferably carried out in 10 to 40 mols of approximately 100 % phosphoric acid for about 10 to 20 hours. According to U.S. Pat. No. 2,874,168, the nitric acid used as nitrating agent is employed simultaneously with a solvent, although in this case reaction times of 36 to 100 hours are required. Unfortunately, the details relating to the high purity and yield of the 1-nitroanthraquinone obtained could not be confirmed (cf. Methoden der Organischen Chemie (Houbel-Weyl), 4th Edition, 1971, Stuttgart, Vol. X/1, page 614).

Accordingly, conventional processes are attended in particular by the disadvantage of low yields despite relatively long reaction times. Furthermore, the process disclosed in German Offenlegungsschrift No. 2,103,360 involves the difficulty of isolating the resulting 1-nitroanthraquinone from the reaction mixture, so that a special separation process was proposed for this purpose in German Offenlegungsschrift No. 2,142,100 using large quantities of organic solvents.

Currently, however the most serious disadvantage is the use of large quantities of a mineral acid as solvent which subsequently has to be worked up at high cost so as to avoid considerable effluent pollution which, even today, and increasingly so in future, is the most serious problem of industrial processes. On the other hand, the solution to this problem of recycling the solvent acid creates more problems as far as the apparatus used to carry out the process are concerned, for example in regard to corrosion prevention and functional reliability. Furthermore, the mineral acid essentially contains the by-products from the preceding nitration cycle, for example 2-nitroanthraquinone and dinitroanthraquinones which have to be removed by extraction before further use which also considerably complicates large-scale working on account of the poor solubility of these by-products.

Accordingly, there is an urgent need for a simple process for the production of 1-nitroanthraquinone by nitrating anthraquinone which gives conversions of almost 100 % and yields of more than 65 % of the theoretical yield and which, in particular, does not give rise at all, or to a very limited extent only, to problems concerning protection of the environment.

It is known that, although the mononitration of anthraquinone preferably takes place in the 1-position, anthraquinone is relatively sluggish in reaction, the mononitration of anthraquinone does not readily take place and requires extremely elaborate measures (Methoden der Organischen Chemie (Houben-Weyl), 4th Edition, 1971, Stuttgart, pages 614, 615). Accordingly, an extensive ionisation or high concentration of nitronium ions of the kind present, for example, in sulphuric acid (l.c. page 485), is required. It is also known that there is only little or extremely little ionisation into nitronium ions in organic solvents which are inert under the reaction conditions, for example chloroform, tetrachloromethane and nitromethane, and that nitration in such inert organic solvents is adopted in those very cases where it is not desired to resort to intensive measures, but instead to carry out nitration under moderate conditions (l.c. page 484).

SUMMARY

It has now surprisingly been found that 1-nitro anthraquinone can be obtained in high yields by nitrating anthraquinone providing the nitration is carried out in the presence of an organic solvent which is inert under the reaction conditions.

DESCRIPTION

The anthraquinone does not have to be dissolved in the organic solvent. In fact it is even particularly advantageous to carry out nitration in heterogeneous phase, in which case the anthraquinone used is merely suspended either wholly or in part in the inert organic solvent.

In the context of the invention, inert organic solvents are solvents of the kind which do not react at all, or to a very limited extent only, with the nitrating agent under the reaction conditions.

Aliphatic and alicyclic hydrocarbons with up to 12 and preferably with up to 6 carbon atoms which can be substituted once or several times by halogen (fluorine, chlorine, bromine and iodine) or the nitro group, are mentioned as examples of solvents suitable for use in the process according to the invention. Specific examples of such solvents include methane, ethane, propane, butane, pentane, hextane, cyclopentane and cyclohexane. This exemplary list naturally includes not only the straight-chain isomers, but also the branched-chain isomers and alkyl-substituted cycloaliphatic compounds.

Preferred solvents are the chlorine-substituted hydrocarbons, for example methylene chloride, chloroform, carbon tetrachloride, 1,1-dichloroethane, 1,2-dichloroethane, 1,1,2-trichloroethane, 1,1,2,2-tetrachloroethane, pentachloroethane, tetrachlorethylene, 1,2-dichloropropane and 1,3-dichloropropane, 1,2,3-trichloropropane, 1,1,2,3- and 1,1,3,3-tetrachloropropane, 1,1,1,3,3-pentachloropropane, 1,1,1,2,3,3- and 1,1,1,2,2,3-hexachloropropane, 1,1,1,2,2,3,3- and 1,1,1,2,3,3,3-heptachloropropane, 1,2- and 1,4-dichlorobutane.

The following are mentioned as specific examples of bromine-substituted hydrocarbons: methylene bromide, bromoform, tetrabromomethane, 1,2-dibromoethane and 1,2-dibromopropane.

In the process according to the invention it is also possible to use hydrocarbons of the kind which are substituted for example by fluorine or simultaneously by different halogens, for example fluorotrichloromethane, difluorodichloromethane, difluorodibromomethane, 1,1,2-trifluoro-1,2,2-trichloroethane and perfluoro-1,3-dimethylcyclohexane.

Of the hydrocarbons substituted by the nitro group nitromethane and nitroethane are mentioned in particular. It is of course also possible to use mixtures of these solvents.

The quantity in which the inert organic solvent is used in accordance with the invention can be varied within wide limits. In general, it amounts to from 0.2 to 25 parts by volume, preferably from 0.4 to 10 parts by volume and, more particularly, to for example from 0.8 to 1.6 parts by volume of solvent per part by weight of anthraquinone used.

Nitric acid is preferably used as the nitrating agent, although it is also possible to use nitrating agents which, in addition to nitric acid, also contain other strong mineral acids, sulphonic acids and/or Lewis acids, for example sulphuric acid, oleum, sulphur trioxide, phosphoric acid, polyphosphoric acid, phosphorus pentoxide, hydrogen fluoride or alkane sulphonic acids and halogenated alkane sulphonic acids, for example methane sulphonic acid, perfluoromethane sulphonic acid, perfluorobutane sulphonic acid and perfluorooctane sulphonic acid. A small addition of these perfluoroalkane sulphonic acids to the nitrating agent, for example especially those nitrating agents which contain sulphuric acid, can be particularly advantageous and can produce a higher yield of 1-nitroanthraquinone and lower contents of 1,5- and/or 1,8-dinitroanthraquinone in the reaction product. In general, the nitric acid is used in quantities of up to about 50 mols, preferably in quantities of up to about 15 moles and, more particularly, in quantities of from about 1 to 2 mols per mol of anthraquinone. If, in addition to nitric acid, the nitrating agent contains others of the acids referred to above, the proportion of mineral or Lewis acids added generally amounts up to about 5 mols, preferably up to about 3 mols and, more particularly, to between about 1 and 1.5 mols, based on the molar quantity of nitric acid.

Nitric acid containing about 90 to 100 % by weight of $HNO_3$ is generally used, although it is also possible to use more dilute nitric acid having an $HNO_3$ content of up to about 50 % by weight in cases where the nitrating agent simultaneously contains strong mineral or Lewis acids which are able to bind water, for example the aforementioned acids. The nitrating agent can also contain mixtures of these acids, and the nitric acid may optionally be replaced either wholly or in part by nitrates, preferably ammonium and alkali nitrates.

cases where less than 10 mols of $HNO_3$ are used per mol of anthraquinone, the addition of water-binding mineral or Lewis acids is essential. Sulphuric acid is preferably used.

Agents which bind the water introduced through the nitrating agent and/or the water formed during the reaction may also be added to the reaction mixture. The above-mentioned acids and mixtures thereof are generally used for this purpose. These agents can in turn already contain up to 20 % by weight of combined water, although preferably they only contain up to 10 % by weight of combined water. In general, these agents are introduced into the reaction mixture together with the nitrating agent, optionally even in admixture with it, although they can also be added before or after the nitrating agent has been added. Some of them, for example sulphur trioxide, can even be added in the form of a solution in one of the organic solvents used in accordance with the invention.

The quantity in which the water-binding agent is used is best selected in accordance with the quantity of nitrating agent used, the water content and the temperature of the reaction mixture. Preferably, the water binding agent is used in quantities of up to 10 mols, more particularly in quantities of up to 2 mols per mole of anthraquinone.

The reaction temperature can be varied within wide limits. In general, the reaction is carried out at temperatures in the range of from −20° to +125°C, preferably at temperatures of from 0° to 105°C and, more particularly, at temperatures of from 20° to 90°C. The process according to the invention is generally carried out at normal pressure, although it can also be carried out under reduced or elevated pressure. In cases where low-boiling solvents are used in the process according to the invention, it may even be essential to work under elevated pressure in order to reach the reaction temperature selected. In general, the process according to the invention is carried out by dissolving or suspending the anthraquinone in the organic solvent used, adding the nitrating agent used all at once, in batches or continuously and keeping the reaction mixture at the reaction temperature selected until the reaction is over. The water-binding agent optionally used is added before, at the same time as or in admixture with or after the nitrating agent, again all at once, in batches or continuously.

It can be advantageous to terminate nitration of the anthraquinone by the process according to the invention at a conversion of from 50 to 90 % by weight of the quantity used, to filter off the 1-nitroanthraquinone formed as a substantially insoluble reaction product and, in this way, to suppress its further nitration into dinitroanthraquinones. For this modified procedure, it is advantageous to select an organic solvent in which 1-nitroanthraquinone is correspondingly poorly soluble and anthraquinone, 2-nitroanthraquinone and dinitroanthraquinones very highly soluble. The mother liquor containing the unreacted anthraquinone can be reused as starting solution or suspension in the process according to the invention following the addition of a correspondingly smaller quantity of anthraquinone. This modified procedure can be of particular advantage for continously working the process according to the invention.

However, the process according to the invention is preferably carried out with as complete a conversion of the anthraquinone as possible because, in this case, the reaction mixture is generally easier to work up through the presence of only very small quantities of unreacted starting material.

On completion of the reaction, the substantially insoluble reaction product can be isolated in different ways. For example, water can be added to the reaction mixture and the organic phase separated off or the organic solvent distilled off and the substantially insoluble reaction product isolated from the aqueous phase, for example by filtration or by centrifuging. The solvent distilled off or the organic phase can be reused or recycled, the circuit optionally containing a facility for working up the organic phase, for example by distillation. The measures required for this purpose are known per se.

During working up of the reaction mixture, alkali liquor can be added to the aqueous solution in quantities sufficient to neutralise the acid constituents of the reaction mixture either before or after the organic solvent has been distilled off.

However, the substantially insoluble reaction product can even be directly isolated on completion of the reaction, for example by filtration or by centrifuging, washed with one of the aforementioned inert organic solvents, preferably with the solvent used for nitration, optionally in conjunction with a small amount of highly concentrated nitric acid and/or with water and subsequently dried. The addition to the organic solvent of a small amount of highly concentrated nitric acid can be particularly advantageous to the production of a purer reaction product. It can be added to the organic solvent used as a washing agent, although it is best added to the reaction mixture on completion of the nitration step but before working up. In general, nitric acid containing from 90 to 100 % by weight of $HNO_3$ is used as the highly concentrated nitric acid in a quantity of up to 25 % by volume, with particular advantage in a quantity of up to 15 % by volume and, more particularly, in a quantity of up to about 10 % by volume of the organic solvent present.

The crude 1-nitroanthraquinone thus isolated can be further purified by methods known per se, for example by washing with carboxylic acid amides (cf. German Offenlegungsschrift No. 2,039,822) or by treatment with aqueous sodium sulphite solution (cf. U.S. Pat. No. 2,302,729).

The process according to the invention can be carried out in batches, for example in stirrer-equipped vessels, or even continuously, for example in a cascade of vessels, in and interval pipe, in a rotary installation or similar apparatus.

It is generally advantageous to carry out the process continuously because the liquid organic phase obtained by separating off the solid reaction product mainly contains anthraquinone and 1-nitroanthraquinone and can be reused in a circuit without further purification. The other secondary products of nitration do not accumulate in the organic phase in this circuit, but instead are discharged with the solid products separated off from which they can in turn readily be separated by methods known per se.

1-nitroanthraquinone is a commercial intermediate product which is used for example for the production of 1-amino anthraquinone, an important intermediate product for a number of anthraquinone dyes.

The process according to the invention affords a number of significant advantages over conventional processes. Thus, the reaction time is considerably reduced, by half at least, in relation to the processes proposed in the prior art. Furthermore, the process according to the invention uses less nitric acid as nitrating agent than corresponds to the prior art and completely eliminates the need to use mineral acids as solvents or diluents. Compared with the prior art, this not only saves mineral acid and, hence, reduces costs, it also solves the problems which would otherwise be involved in working up or eliminating such quantities of acids. This last point is of particular significance in view of the increasing requirements concerning protection of the environment and, in itself, substantiates the advance of the process according to the invention over the prior art.

In addition, the inert organic solvent used in the process according to the invention can be reused either directly or, if necessary, after working up, for example by distillation. The aqueous acidic phase which is substantially free from dissolved secondary products can also be reconcentrated by addition of the above-mentioned water-binding agents or, for example, corresponding acid anhydrides, and then recycled. This has the further advantage over the already proposed reuse of the mineral acids employed as solvents that considerably smaller quantities of highly concentrated mineral acids have to be handled, there is no need for complicated working up to remove dissolved secondary products, nor are there any corrosion problems.

In addition, the reaction product obtained contains smaller quantities of secondary products than corresponds to the prior art, and accumulates in a form which enables further purification by methods known per se to be carried out particularly easily and effectively.

Finally, substantially higher yields are obtained with conversions of almost 100 %, thus considerably simplifying nitration of the anthraquinone on an industrial scale and considerably increasing the economy of the process.

The percentages in the following Examples relate to weight unless otherwise stated. Where contents are given in percent for mineral acids, the rest is water.

EXAMPLE 1

A nitration mixture of 68.4 ml of 98 % by weight nitric acid and 85.2 ml of 100 % by weight sulphuric acid was gradually added dropwise over a period of about 150 minutes to a suspension of 250 g (=1.2 mols) of anthraquinone (99 %) in 200 ml of methylene chloride boiling under reflux in a simple glass apparatus, consisting of a 1 liter four-necked flask equipped with a stirrer, internal thermometer, reflux condenser and dropping funnel. This was followed by stirring for 4 hours at the same temperature and then cooling to room temperature. The reaction mixture was then poured into 500 ml of water and the organic solvent was distilled off. The residual aqueous suspension was filtered, the filter cake washed neutral with water and then dried.

A crude yield of 299 g with a 1-nitroanthroquinone content of 77 % by weight was obtained, corresponding to a yield of 77 % of the theoretical yield.

EXAMPLE 2

A suspension of 250 g of anthraquinone in 200 ml of methylene chloride was nitrated as described in Example 1. After cooling, the deposit was filtered off under suction, washed with about 100 to 200 ml of methylene chloride and then with water until neutral. A filter residue of 257 g was obtained, containing 86 % by weight of 1-nitroanthraquinone (74 % of the theoretical yield). The filter residue was heated to 100°C with 2 liters of 2.5 % by weight aqueous sodium sulphite solution and kept at this temperature for 4 hours. The 1-nitroanthraquinone was then filtered off, washed with water and dried. 1-nitroanthraquinone with a content of 95 % was obtained in a yield of 226 g, corresponding to a yield of 71 % of the theoretical yield. The methylene chloride mother liquor mainly contained anthraquinone and 1-nitroanthraquinone and could be reused for the production of 1-nitroanthraquinone or even for the production of dintroanthraquinone.

The total yield of 1-nitroanthraquinone amounted to 75 % of the theoretical yield.

EXAMPLE 3

160 ml of a nitration acid of 39 % by weight of nitric acid and 60 % by weight of sulphuric acid were added dropwise over a period of about 2.5 hours at 40°C to a suspension of 250 g of anthraquinone in 200 ml of 1,2-dichloroethane, followed by stirring for 4 hours at 40°C. Another 200 ml of 1,2-dichloroethane and 10 ml of 98 % nitric acid were then added, followed after 1 hour by cooling to 20°C, after which the deposit obtained was filtered off under suction.

After washing with water, the filter residue was heated for 6 hours to 100°C with 2 liters of 2.5 % aqueous sodium sulphite solution. The insoluble 1-nitroanthraquinone was filtered off, washed salt-free with water and then dried.

A 93 % of 1-nitroanthraquinone was obtained in a yield of 222 g. The dichloroethane mother liquor could be reused for nitration following the addition of anthraquinone.

The conversion amounted to 99% and the yield of 1-nitroanthraquinone, excluding the quantity present in the mother liquor, to 69 % of the theoretical yield.

EXAMPLE 4

250 g of anthraquinone were suspended in 400 ml of 1,1,2,2-tetrachloroethane and nitrated for about 2.5 hours at 40°C with a nitration acid of 68.4 ml of 98 % by weight nitric acid and 85.2 ml of 100 % by weight sulphuric acid. This was followed by stirring for 4 hours at the same temperature. The crude yield amounted to 244 g of 80 % 1-nitroanthraquinone, whilst 16 g of a mixture of unreacted anthraquinone and 1-nitroanthraquinone were left in the mother liquor and could be recycled with the mother liquor. Further purification gave 220 g of 91 % 1-nitroanthraquinone corresponding to 67 % of the theoretical yield, whilst the total yield amounted to 71 % of the theoretical yield.

EXAMPLE 5

A suspension of 250 g of anthraquinone in 200 ml of 1,2-dichloropropane was gradually nitrated over a period of about 2.5 hours at 40°C with 160 ml of a nitration acid of 39 % by weight of $HNO_3$ and 60 % by weight of $H_2SO_4$. Filtration gave 290 g of 76 % 1-nitroanthraquinone corresponding to a yield of 73 % of the theoretical yield.

Purification as described in Example 2 gave 229 g of 90 % 1-nitroanthraquinone, corresponding to a yield of 68 % of the theoretical yield.

EXAMPLE 6

250 g of anthraquinone suspended in 1600 ml of methylene chloride were nitrated for 2 to 3 hours under reflux conditions (42°C) with a nitration acid of 76.4 ml of 98 % nitric acid and 85.2 ml of 100 % sulphuric acid. After stirring for 4 hours at the same temperature, the deposit was filtered off at about 20°C, washed and dried. The yield amounted to 189 g of 88 % 1-nitroanthraquinone, corresponding to 55 % of the theoretical yield. 62 g of a mixture of anthraquinone and 1-nitroanthraquinone were left in the mother liquor and could be reused for nitration with the mother liquor.

EXAMPLE 7

A suspension of 250 g of anthraquinone in 1600 ml of methylene chloride was nitrated for about 2.5 hours under reflux conditions with the nitration acid specified in Example 1, followed by stirring for 4 hours at the same temperature. After cooling and filtration, 89 % 1-nitroanthraquinone was obtained in a yield of 178 g, whilst 76 g of a mixture of anthraquinone and 1-nitroanthraquinone were left in the methylene chloride mother liquor and could be recycled with it.

EXAMPLES 8 to 19

The following Examples were carried out in basically the same way. A suspension of the quantity of anthraquinone specified in column 2 was nitrated for about 2 to 3 hours at the temperature specified in column 7 with a nitration acid of nitric acid and sulphuric acid, for which the quantities and percent by weight of pure acid are specified in columns 5a to 6b, in the volumne specified in column 3 of the solvent identified in column 4, followed by stirring at the same temperature for the period expressed in hours in column 8. The molar ratio of anthraquinone to $HNO_3$ to $H_2SO_4$ in the reaction mixture is shown in column 9. Columns 10, 11 and 12 show the total conversion of anthraquinone, the yield of 1-nitroanthraquinone in the deposit filtered off and the total yield, including the quantity left in the mother liquor in percent of the theoretical.

| 1 | 2 | 3 | 4 | 5 | | 6 | | 7 | 8 | 9 | 10 | 11 | 12 |
|---|---|---|---|---|---|---|---|---|---|---|---|---|---|
| | anthra- | | | a | b | a | b | | | | % | | |
| Ex. No. | quinone g | ml | solvent | ml | $HNO_3$ % by weight | ml | $H_2SO_4$ % by weight | °C | h | anthraquinone: $HNO_3$:$H_2SO_4$ | conversion | % | yield |
| 8 | 250 | 400 | $CH_2Cl_2$ | 68.4 | 98 | 85.2 | 100 | 42 | 4 | 1:1.34:1.34 | 97 | 74 | 77 |
| 9 | 250 | 1200 | $CH_2Cl_2$ | 68.4 | 98 | 85.2 | 100 | 42 | 4 | 1:1.34:1.34 | 89 | 60 | 67 |
| 10 | 250 | 400 | $(-CH_2Cl)_2$ | 68.4 | 98 | 85.2 | 100 | 40 | 16 | 1:1.34:1.34 | 98 | 73 | 74 |
| 11 | 250 | 1200 | $(-CH_2Cl)_2$ | 68.4 | 98 | 85.2 | 100 | 40 | 4 | 1:1.34:1.34 | 89 | 57 | 66 |
| 12 | 250 | 1200 | $(-CH_2Cl)_2$ | 68.4 | 98 | 85.2 | 100 | 85 | 4 | 1:1.34:1.34 | 94 | 53 | 60 |
| 13 | 62.5 | 400 | $CH_2Cl_2$ | 17.1 | 98 | 23.8 | 100 | 42 | 4 | 1:1.34:1.50 | 92 | 61 | 71 |
| 14 | 62.5 | 100 | $CH_2Cl_2$ | 17.1 | 98 | 24.0 | 96 | 42 | 4 | 1:1.34:1.46 | 92 | 65 | 9 |
| 15 | 31.2 | 200 | $CCl_4$ | 8.5 | 98 | 10.6 | 100 | 76 | 5 | 1:1.34:1.34 | 71 | 44 | 46 |
| 16 | 62.5 | 200 | $Cl_2C=CCl_2$ | 21.8 | 98 | 27.2 | 100 | 40 | 4 | 1:1.71:1.71 | 50 | | 32 |
| 17 | 62.5 | 100 | $CH_3-NO_2$ | 17.1 | 98 | 21.3 | 100 | 60 | 6 | 1:1.34:1.34 | 55 | 37 | 39 |
| 18 | 250 | 200 | $CH_2ClCHCl-CH_2Cl$ | 80.8 | 98 | 100.7 | 100 | 40 | 4 | 1:1.58:1.58 | 99 | 73 | 74 |
| 19 | 250 | 200 | $CH_2Cl_2$ | 68.4 | 98 | 85.2 | 100 | 42 | 4 | 1:1.34:1.34 | 98 | 74 | 77 |

Note: $(-CH_2Cl)_2$ = 1,2-dichloroethane

EXAMPLE 20

62.5 g of anthraquinone were introduced together with 17.1 ml of 98 % nitric acid and 300 ml of methylene chloride at a temperature of about 42°C, and a solution of 16.2 g of sulphur trioxide in 100 ml of methylene chloride slowly added over a period of about 2.5 hours. This was followed by stirring for 4 hours at about 42°C and, after cooling, the deposit formed was filtered off under suction at about 20°C. The yield amounted to 44.6 g of 84 % 1-nitroanthraquinone; taking the mother liquor into account, the conversion amounted to 88 % of the anthraquinone used and the yield of 1-nitroanthraquinone to 60 % of the theoretical yield.

EXAMPLE 21

31.8 ml of 100 % by weight sulphuric acid were gradually added with stirring over a period of about 2 to 3 hours at 20°C to 83.2 g of anthraquinone, 51.0 ml of 98 % nitric acid and 400 ml of methylene chloride. This was followed by stirring for 4 hours at 20°C, after which the reaction mixture was poured into 500 ml of water and the deposit filtered off. The yield amounts to 63.0 g of 77 % 1-nitroanthraquinone.

EXAMPLE 22

A suspension of 62.4 g of anthraquinone in 400 ml of methylene chloride is nitrated at about 42°C by the dropwise addition of a mixture of 17.1 ml of 98 % nitric acid, 21.3 ml of 100 % sulphuric acid and 6.3 g of 100 % phosphoric acid. On completion of the addition, the mixture was stirred for 4 hours at about 42°C, cooled to room temperature, the deposit filtered off, washed with water and dried. 90 % 1-nitroanthraquinone containing inter alia approximately 2 % of 1,5-dinitroanthraquinone is obtained in a yield of 39.4 g. The yield of 1-nitroanthraquinone corresponds to 72 % of the theoretical, 87 % of the anthraquinone used having been reacted.

EXAMPLE 23

52 g of anthraquinone were introduced with stirring over a period of about 10 minutes at 20°C into a mixture of 125 ml of methylene chloride and 375 ml of 98 % nitric acid. After stirring for another 30 minutes, the mixture was poured onto 2 liters of ice water, the organic solvent distilled off and the deposit filtered. A 79 % 1-nitroanthraquinone was obtained in a yield of 62.5 g, corresponding to 79 % of the theoretical yield.

EXAMPLE 24

85.2 ml of 100 % sulphuric acid were slowly added dropwise with stirring over a period of about 2.5 hours at about 42°C to a mixture of 250 g of anthraquinone, 68.4 ml of 98 % nitric acid and 200 ml of methylene chloride. This was followed by stirring for 4 hours at about 42°C and then by filtration at 20°C. After washing and drying, the filter residue yielded 262 g of 86 % 1-nitroanthraquinone which only contained traces of anthraquinone and 2-nitroanthraquinone in addition to dinitroanthraquinone.

The mother liquor contains 10 g of anthraquinone and 1-nitroanthraquinone in admixture and can be renitrated as described above following the addition of anthraquinone.

The yield of isolated 1-nitroanthraquinone amounted to 75 % of the theoretical yield, and the total yield to 78 % of the theoretical yield.

EXAMPLE 25

A suspension of 250 g of anthraquinone in 200 ml of methylene chloride was nitrated as described in Example 24. On completion of the reaction, the reaction mixture was poured into 500 ml of water and the organic solvent distilled off. The residual aqueous suspension was filtered, the filter cake washed neutral with water and dried. 78 % 1-nitroanthraquinone was obtained in a yield of 300 g, corresponding to 78 % of the theoretical yield. After heating for 6 hours to about 100°C with 2.4 liters of 3.8 % sodium sulphite solution, 89 % 1-nitroanthraquinone was isolated in a yield of 249 g, corresponding to 74 % of the theoretical yield.

EXAMPLE 26

250 g of anthraquinone in 200 ml of 1,2-dichloroethane were nitrated slowly for about 2 to 3 hours at 40°C by the dropwise addition of 160 ml of a nitration acid of 39 % by weight of nitric acid and 60 % by weight of sulphuric acid. This was followed by stirring for 4 hours at the same temperature, after which the mixture was cooled to room temperature and 10 ml of 98 % nitric acid were added. After another hour, 500 ml of water were added, the solvent was distilled off and, after filtration, 76 % 1-nitroanthraquinone obtained in a yield of 305 g corresponding to 77 % of the theoretical yield.

EXAMPLE 27

The evaporation residue of the methylene chloride mother liquor of Example 2, together with 242 g of anthraquinone and 200 ml of methylene chloride, was nitrated under reflux conditions (42°C) with nitration acid of 73.4 ml of 98 % nitric acid and 91.7 ml of 100 % sulphuric acid. After a total of 7 hours, the reaction mixture was cooled to 20°C and the deposit separated off by filtration. After washing and drying, 83 % 1-nitroanthraquinone was obtained in a yield of 276 g, corresponding to a yield of 76 % of the theoretical yield.

The methylene chloride mother liquor can be reused as already described.

EXAMPLE 28

The evaporation residue of the methylene chloride mother liquor of Example 2, together with 242 g of anthraquinone and 200 ml of methylene chloride, was slowly nitrated under reflux conditions with a nitration acid of 71.1 ml of 98 % nitric acid and 88.8 ml of 100 % sulphuric acid. After stirring for another 4 hours at 42°C, 200 ml of methylene chloride and 10 ml of 98 % nitric acid were added, the mixture was allowed to cool to 20°C and then stirred for 1 hour at this temperature. The deposit was filtered off under suction, washed first with 2 × 100 ml of methylene chloride and then with water until neutral, followed by drying. The yield then amounted to 283 g of 83 % 1-nitroanthraquinone and the total yield of 83 % of the theoretical yield. The methylene chloride mother liquor could be reused for nitration.

EXAMPLE 29

250 g of anthraquinone were nitrated as described in Example 8. After cooling to 20°C, 7 ml of 98 % nitric acid were added, the mixture stirred for 1 hour at this temperature and the deposit filtered off. The filter cake washed neutral with water was heated for 4 hours to 100°C with 2 liters of 2.5 % sodium sulphite solution. The 1-nitroanthraquinone was then filtered off, washed with water and dried. The yield amounted to 209 g of 95 % 1-nitroanthraquinone, corresponding to 66 % of the theoretical yield. Another 21 g of a mixture of anthraquinone and 1nitroanthraquinone were contained in the methylene chloride mother liquor.

EXAMPLE 30

250 g of anthraquinone were nitrated as described in Example 25. On completion of the reaction, the mixture was poured into 2 liters of water, neutralised by the addition of approximately 302 g Of 45 % by weight sodium hydroxide and the methylene chloride distilled off. After filtration under suction washing and drying, 78 % 1-nitroanthraquinone was obtained in a yield of 306 g, corresponding to 79 % of the theoretical yield.

EXAMPLE 31

85.2 ml of 100 % by weight sulphuric acid were slowly added dropwise with stirring over a period of about 3 hours at about 42°C to a mixture of 250 g of anthraquinone, 200 ml of methylene chloride, 68.4 ml of 98 % by weight nitric acid and 2 ml of perfluorobutanesulphonic acid. This was followed by stirring for 4 hours at the same temperature, after which the reaction mixture was poured into 500 ml of water. The methylene chloride was then distilled off, the residual aqueous suspension filtered, the filter cake obtained washed neutral with water and then dried. 306 g of a reaction product containing 82 % by weight of 1-nitroanthraquinone and only about 2.3 % by weight of 1,5-dinitroanthraquinone, 1.7 % by weight of 1,8-dinitroanthraquinone and 1 % by weight of anthraquinone, were obtained in this way. Accordingly, the yield of 1-nitroanthraquinone amounted to 83 % of the theoretical yield.

What is claimed is:

1. In a process for preparing 1-nitroanthraquinone by nitrating anthraquinone the improvement which comprises carrying out the nitration in the presence of at least one organic solvent which is inert under the reaction conditions said solvent being selected from the group consisting of aliphatic and alicyclic hydrocarbons with up to 12 carbon atoms and the foregoing substituted one or more times by halogen or nitro.

2. Process of claim 1 wherein the aliphatic or alicyclic hydrocarbon has up to 6 carbon atoms.

3. Process of claim 1 wherein the organic solvent is an aliphatic chlorinated hydrocarbon having up to 6 carbon atoms.

4. Process of claim 1 wherein the organic solvent is selected from the group of methylene chloride, 1,2-dichloroethane, 1,1,2,2-tetrachloroethane and 1,2-dichloropropane.

5. Process of claim 1 wherein the organic solvent is nitromethane or nitroethane.

6. Process of claim 1 wherein the organic solvent is used in a quantity of from 0.2 to 25 parts by volume per part by weight of the anthraquinone used.

7. Process of claim 1 wherein the organic solvent is used in a quantity of from 0.4 to 10 parts by volume per part by weight of the anthraquinone used.

8. Process of claim 1 wherein the organic solvent is used in a quantity of from 0.8 to 1.6 parts by volume per part by weight of the anthraquinone used.

9. Process of claim 1 wherein the anthraquinone is subtantially completely nitrated to 1-nitroanthraquinone.

10. Process of claim 1 wherein nitric acid is used as the nitrating agent.

11. Process of claim 10 wherein the nitric acid is used in a quantity of up to 50 mols per mole of anthraquinone.

12. Process of claim 10 wherein the nitric acid is used in a quantity of from 1 to 2 mols per mol of anthraquinone.

13. Process of claim 1 wherein the reaction is carried out at a temperature in the range of from −20°C to 125°C.

14. Process of claim 1 wherein the reaction is carried out at a temperature of from 20° to 90°C.

15. Process of claim 1 carried out continuously.

* * * * *